Jan. 10, 1939.                R. A. CRAWFORD              2,143,544
                                GOLF BALL COVER
                               Filed Oct. 8, 1936
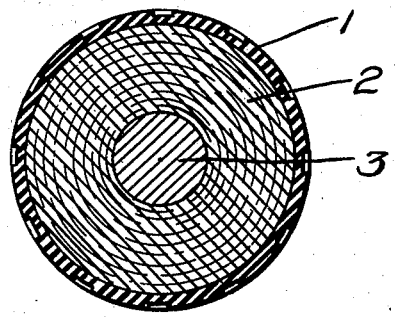
Inventor
Richard A. Crawford
By Willis J. Avery
    Atty Patented Jan. 10, 1939

2,143,544

UNITED STATES PATENT OFFICE 2,143,544

GOLF BALL COVER

Richard A. Crawford, Akron, Ohio, assignor to The B. F. Goodrich Company, New York, N. Y., a corporation of New York Application October 8, 1936, Serial No. 104,712

5 Claims. (Cl. 273—62)

This invention relates to improved compositions useful in golf ball covers. Its principal object is to make a tough and shock-resistant cover composed only partly of balata without impairing the flexibility, click, and other properties essential to golf ball covers.

Heretofore, the best golf ball covers have been comprised principally of gutta percha or balata in a vulcanized or unvulcanized state. These compositions make satisfactory covers, but they are very expensive. Cheaper covers in which part of the balata is replaced by other substances such as glue or fillers have been developed, but their properties were not good enough to displace balata covers on the first-class balls. The substituted balata covers were often found to be either dead or too rubbery, to lack click, or to lack toughness so that they became dented or gouged out under the severe shocks to which golf balls are necessarily subjected.

I have discovered a golf ball cover composition comprising a three component system of masticated rubber, refined balata, and thermoprene, which system substantially duplicates the mechanical properties of wholly deresinated balata. The most important factor in my invention is that the three components must be present in such proportions as to form a stable system. Stability is defined throughout this application by the following test: A molded sample is bent sharply (180°). A stable system shows no whitening at the bend. Unstable system whiten, and if sufficiently unstable, will crack. Unstable systems are unsuitable for golf ball covers because they are apt to be spongy or cheesy, and present a surface which is easily dented and cut. But stable systems of the three components which I employ exhibit properties similar to and sometimes better than the properties of the best balata covers which are manufactured.

The invention is illustrated by the accompanying drawing showing a cross-section of a golf ball having a cover 1 comprising balata, a themoprene, and rubber in such proportions as to form a stable system, a winding 2, preferably of thread rubber, and a core 3.

A thermoprene is made from rubber, and is a thermoplastic unsaturated hydrocarbon isomeric with and having less unsaturation than rubber. As examples of suitable thermoprenes, I will mention those made according to the specifications of U. S. Patent No. 1,605,180 granted November 2, 1926, to Harry L. Fisher. I prefer to use the harder, tough, heat-plastic products which more or less resemble balata.

To prepare thermoprene, I prefer to proceed as in Example 2 of aforementioned Patent No. 1,605,180 except that I use 8 parts of p-phenol sulfonic acid. I may use any of the equivalents for p-phenol sulfonic acid mentioned in the patent, however.

To prepare another thermoprene useful for golf-ball covers, I isomerize 100 parts by weight of specially selected pale crepe by adding 7 parts of sulfuric acid (sp. gr. 1.84) and one part by weight of retort pine tar or turpentine and heating until a balata-like product is formed.

Using one of these thermoprenes, I prepare my golf ball cover stocks. I preferably use refined balata and high grade masticated pale crepe. One very satisfactory material comprises:

| | Parts by weight |
|---|---|
| Refined balata | 53 |
| Masticated rubber | 27 |
| Thermoprene | 20 |

Another suitable material comprises:

| | Parts by weight |
|---|---|
| Refined balata | 51 |
| Masticated rubber | 22 |
| Thermoprene | 27 |

The thermoprene mentioned in these two recipes may be made from rubber isomerized with either p-phenol sulfonic acid or sulfuric acid. Resilience, hardness, and resistance to cut may be varied by changing the relative proportions of the three components. Stable compositions suitable for use as golf ball cover compositions will be found within the following range of proportions:

| | Parts by weight |
|---|---|
| Refined balata | 25 to 75 |
| Masticated rubber | 12 to 50 |
| Thermoprene | 15 to 50 |

Any type of golf ball center is then covered with the stock in any desired manner, and the ball is subjected to heat and pressure to bind the cover to the center and to set the cover into a hard, durable material. A preferred method is to use a center comprising a liquid core surrounded by a winding of tense rubber thread. The cover stock is shaped into two hemispheres, usually with the aid of heat. The hemispheres are placed around the center, and the ball is placed in a heated press and cooled under pressure.

A variety of materials may be added to these stable three-component stocks to vary the properties of the covers. An excellent white cover is made by the following recipe:

| | Parts by weight |
|---|---|
| Refined balata | 39.80 |
| Masticated rubber | 17.05 |
| Thermoprene | 21.05 |
| Titanium dioxide | 22.00 |
| Ultramarine blue | .10 |
| | 100.00 |

The thermoprene may be made from rubber isomerized with either sulfuric acid or p-phenol sulfonic acid. A ball with this cover has a long life, gives good click, and the cover is unusually resistant to severe shocks such as are produced when the ball is "topped."

If a vulcanized cover is desired, curing ingredients may be added. The thermoprene in the following recipes is made from rubber and para phenol sulfonic acid.

*Recipe A*

| | Parts by weight |
|---|---|
| Refined balata | 27.32 |
| Thermoprene | 14.56 |
| Masticated rubber | 10.00 |
| Zinc oxide | 8.74 |
| Zinc stearate | 5.84 |
| Titanium dioxide | 30.62 |
| Sulfur | 2.92 |
| | 100.00 |

*Recipe B*

| | Parts by weight |
|---|---|
| Refined balata | 50.00 |
| Thermoprene | 14.56 |
| Masticated rubber | 28.22 |
| Titanium dioxide | 5.78 |
| Piperidine pentamethylene dithio carbamate | 1.44 |
| | 100.00 |

To prepare the cover, equal portions of these two recipes are mixed just before the stock is to be used. After the stock has been applied to the center, the ball is cured in a press for ten minutes at 240° F.

All recipes have to be prepared with a particular thermoprene in mind. Although it often happens that thermoprenes prepared by different isomerizing agents may be substituted in the same recipe, different thermoprenes have different phase relationships with rubber and balata. The conditions of stability for each thermoprene must be determined before recipes containing the thermoprene are prepared.

It is to be understood that my invention is not limited by the specific examples herein cited for illustrative purposes. It is the essense of my invention to form a stable system comprising at least rubber, thermoprene and balata. As long as stability is maintained, proportions may be altered, and pigments, fillers, softeners, accelerators, antioxidants, and the like may be incorporated into the covers without exceeding the spirit and scope of my invention.

I claim:

1. A golf ball cover comprising balata, a thermoprene, and rubber in such proportions as to form a stable system.

2. A golf ball cover comprising balata, rubber isomerized with sulfuric acid, and rubber in such proportions as to form a stable system.

3. A golf ball cover comprising balata, rubber isomerized with p-phenol sulfonic acid, and rubber in such proportions as to form a stable system.

4. A golf ball cover comprising a stable system of balata, a thermoprene, rubber, and curing agents.

5. A golf ball cover comprising a stable system of balata, rubber isomerized with p-phenol sulfonic acid, rubber, sulfur, and an accelerator.

RICHARD A. CRAWFORD.